United States Patent
Tsai et al.

(10) Patent No.: US 8,975,881 B2
(45) Date of Patent: Mar. 10, 2015

(54) BOOST CONVERTER CIRCUIT

(71) Applicant: ASUSTeK Computer Inc., Peitou, Taipei (TW)

(72) Inventors: Ming-Ting Tsai, Taipei (TW); Hsiang-Jui Hung, Taipei (TW); Chih-Wan Hsu, Taipei (TW); Wen-Chen Tu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 13/838,410

(22) Filed: Mar. 15, 2013

(65) Prior Publication Data
US 2014/0055113 A1    Feb. 27, 2014

(30) Foreign Application Priority Data

Aug. 27, 2012 (CN) .......................... 2012 1 0308672

(51) Int. Cl.
*G05F 1/40* (2006.01)
*G05F 1/62* (2006.01)

(52) U.S. Cl.
CPC ...................................... *G05F 1/62* (2013.01)
USPC ....................................................... 323/272

(58) Field of Classification Search
USPC ............. 323/222, 268, 269, 272, 282; 363/72
See application file for complete search history.

(56) References Cited

U.S. PATENT DOCUMENTS

| 5,905,369 | A  | * | 5/1999  | Ishii et al. ..................... 323/272 |
| 8,098,505 | B1 | * | 1/2012  | Choi ............................... 363/89 |
| 8,446,098 | B2 | * | 5/2013  | Shiu et al. ..................... 315/247 |
| 8,614,902 | B2 | * | 12/2013 | Pansier et al. ................... 363/89 |

FOREIGN PATENT DOCUMENTS

| CN | 101217255 A | 7/2008 |
| TW | 201114156 A | 4/2011 |

* cited by examiner

*Primary Examiner* — Adolf Berhane
(74) *Attorney, Agent, or Firm* — Muncy, Geissler, Olds & Lowe, P.C.

(57) ABSTRACT

A boost converter circuit includes a first boost module, a first detecting unit, a second boost module and a first detecting unit. The first boost module includes a first comparing control unit. The first detecting unit is coupled to the first boost module, and the first detecting unit adjusts a first input signal of the first comparing control unit according to a first signal of the first boost module. A second boost module is connected in parallel to the first boost module, and the second boost module includes a second comparing control unit. The second detecting unit is coupled to the second boost module, and the first detecting unit adjusts a second input signal of the second comparing control unit according to a second signal of the second boost module.

8 Claims, 7 Drawing Sheets

US 8,975,881 B2

BOOST CONVERTER CIRCUIT

CROSS-REFERENCE TO RELATED APPLICATION

This application claims the priority benefit of CN application serial no. 201210308672.X, filed on Aug. 27, 2012. The entirety of the above-mentioned patent application is hereby incorporated via reference herein and made a part of specification.

BACKGROUND OF THE INVENTION

1. Field of the Invention

The disclosure relates to a boost converter circuit, more particularly, to a boost converter circuit applied to a boost converter.

2. Description of the Related

A boost converter is widely used at kinds of electronic devices to raise the input voltage to the required operating voltage of electronic devices to make electronic devices operate normally.

However, since the electronic device becomes light, small, and thin, inner space of the electronic device is more limited. The size and height of the inductor of the boost converter increase with the increase of the inductance. When the boost converter needs larger output current, the height of the inductor increases, and it is not easily to make the electronic device thinner.

BRIEF SUMMARY OF THE INVENTION

A boost converter circuit is provided. The boost converter circuit includes a first boost module, a first detecting unit, a second boost module, and a second detecting unit. The first boost module includes a first comparing control unit. The first detecting unit is coupled to the first boost module, and the first detecting unit adjusts a first input signal of the first comparing control unit according to a first signal of the first boost module. The second boost module is connected in parallel to the first boost module, and the second boost module includes a second comparing control unit. The second detecting unit is coupled to the second boost module, and the second detecting unit adjusts a second input signal of the second comparing control unit according to a second signal of the second boost module.

Since the boost converter circuit includes the first detecting unit and the second detecting unit, when the first boost module is connected in parallel to the second boost module, the boost converter circuit gets larger output current without increasing of the inductance of the inductor, and the thickness of the electronic device is decreased.

DETAILED DESCRIPTION OF THE EMBODIMENTS

Figure 1:
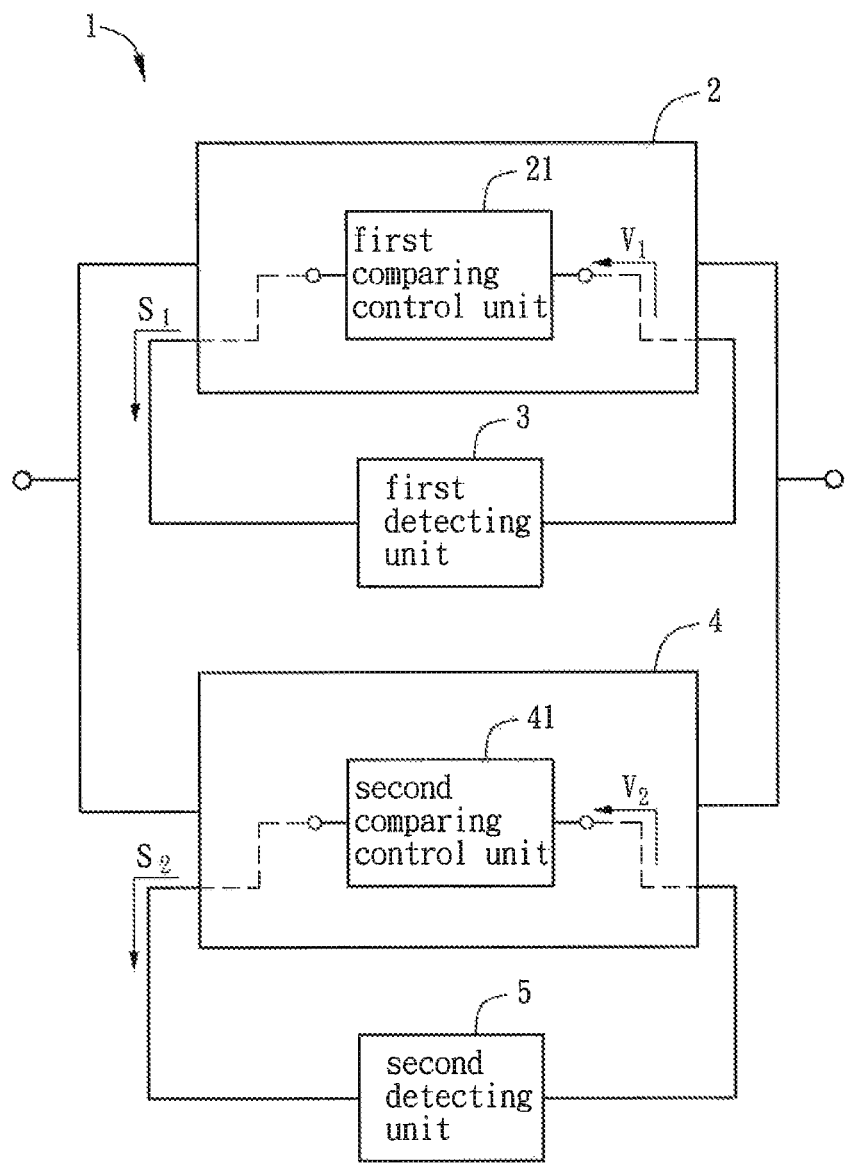
FIG. 1 is a block diagram of a boost converter circuit in one embodiment.

FIG. 1 is a block diagram of the boost converter circuit. The boost converter circuit 1 includes a first boost module 2, a first detecting unit 3, a second boost module 4 and a second detecting unit 5. The first boost module 2 includes a first comparing control unit 21, the second boost module 4 includes a second comparing control unit 41, and the first boost module 2 is connected in parallel to the second boost module 4.

The first detecting unit 3 is coupled to the first boost module 2, and the first detecting unit 3 adjusts a first input signal V1 of the first comparing control unit 21 according to a first signal S1 of the first boost module 2. The second detecting unit 5 is coupled to the second boost module 4, and the second detecting unit 5 adjusts a second input signal V2 of the second comparing control unit 41 according to a second signal S2 of the second boost module 4.

Figure 2A:
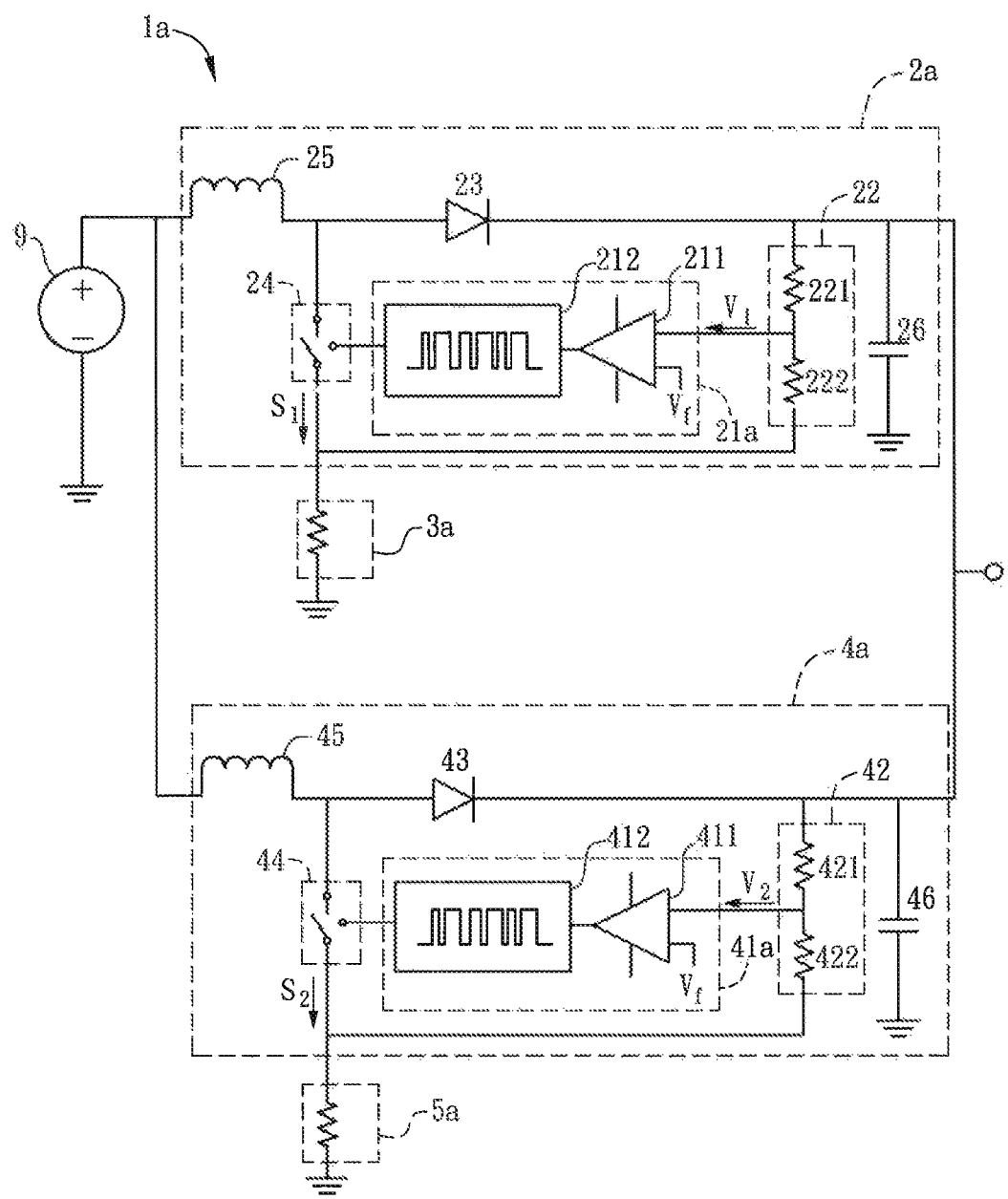
FIG. 2A is a circuit diagram of a boost converter circuit in a first embodiment.

FIG. 2A is a circuit diagram of the boost converter circuit 1a, in a first embodiment.

The first boost module 2a includes a first comparing control unit 21a, a first voltage division unit 22, a first rectifying unit 23, a first switching unit 24, a first inductor 25 and a first energy storage unit 26.

A first end of the first inductor 25 is coupled to direct current (DC) power supply 9, and a second end of the first inductor 25 is coupled to a first end of the first rectifying unit 23. A first end of the first switching unit 24 is coupled to a second end of the first inductor 25, and a second end of the first switching circuit 24 is coupled to a first end of the first comparing control unit 21a.

A first end of the first voltage division unit 22 is coupled to a second end of the first rectifying unit 23, and a second end of the first voltage division unit 22 is coupled to a second end of the first comparing control unit 21a. The first energy storage unit 26 is coupled to the second end of the first rectifying unit 23, and the first energy storage unit 26 is a capacitor.

The first detecting unit 3a is coupled to a third end of the first switching unit 24 and a third end of the first voltage division unit 22. The first detecting unit 3a is a resistor component.

The first comparing control unit 21a includes a first compare component 211 and a control component 212 connected in series. The first voltage division unit 22 includes a first voltage division resistor 221 and a second voltage division resistor 222 connected in series. A second end of the first voltage division unit 22 provides a first input signal V1 to the first compare component 211 according to the voltage division theorem of two voltage division resistors connected in series.

The first input signal V1 is compared to reference voltage Vf and a comparing result is generated, and a first result signal is transmitted to the first control component 212 according to the comparing result. The first control component 212 may be a plus width modulation (PWM) which modulates according to the first result signal and outputs a first control signal to the second end of the first switching unit 24. The first switching unit 24 may be a transistor switch which is open or closed determined by the first control signal.

The first signal S1 detected by the first detecting unit 3a is a current signal flowing through the first switching unit 24. When the first signal S1 flows through the first detecting unit 3a, a cross voltage is generated between two ends of the first detecting unit 3a. With the change of current value of the first signal S1, the cross voltage changes correspondingly, and the first input signal V1 outputted by the first voltage division unit 22 is also changed.

When the first detecting unit 3a detects that the current of the first signal S1 is decreased, the voltage between two ends of the resistor component is reduced to increase the voltage between the first end and the third end of the first voltage division unit 22, and then the voltage signal of the first input signal V1 of the second end increases accordingly.

Conversely, when the first detecting unit 3a detects that the current of the first signal S1 increases, the voltage between two ends of the resistor component is increased to reduce the voltage between the first end and the third end of the first voltage division unit 22, and then the voltage of the first input signal V1 of the second end is decreased accordingly. Consequently, the voltage of the first input signal V1 of the first comparing control unit 21a can be adjusted.

The second boost module 4a includes a second comparing control unit 41a, a second voltage division unit 42, a second rectifying unit 43, a second switching unit 44, a second inductor 45, and a second storage unit 46.

A first end of the second inductor 5 is coupled to the direct current power supply 9, and a second end of the second inductor 45 is coupled to a first end of the second rectifying unit 43. A first end of the second switching unit 44 is coupled to the second end of the second inductor 45, and a second end of the second switching unit 44 is coupled to a first end of the second comparing control unit 41a.

A first end of the second voltage division unit 42 is coupled to a second end of the second rectifying unit 43, and a second end of the second voltage division unit 4 is coupled to a second end of the second comparing control unit 41a. The second storage unit 46 is coupled to the second end of the second rectifying unit 43, and the second storage unit 46 is a capacitor.

The second detecting unit 5a is coupled to a third end of the second switching unit 44 and a third end of the second voltage division unit 42. The second detecting unit 5a is a resistor component.

The operation principles of the circuit of the second boost module 4a and the second detecting unit 5a are same to the first boost module 2a and the first detecting unit 3a, which is omitted herein.

By the adjustment of the first detecting unit 3a and the second detecting unit 5a, the input signals of the first comparing control unit 21a and the second comparing control unit 41a would not be forced to the same due to parallel connection between the first boost module 2a and the second boost module 4a, and the situation that the first compare component 211 and the second compare component 411 cannot achieve parallel connection due to the mismatch of components can be avoided. The current of the output end of the boost converter circuit 1a equals the output current of the first boost module 2a plus the output current of the second boost module 4a.

Figure 2B:
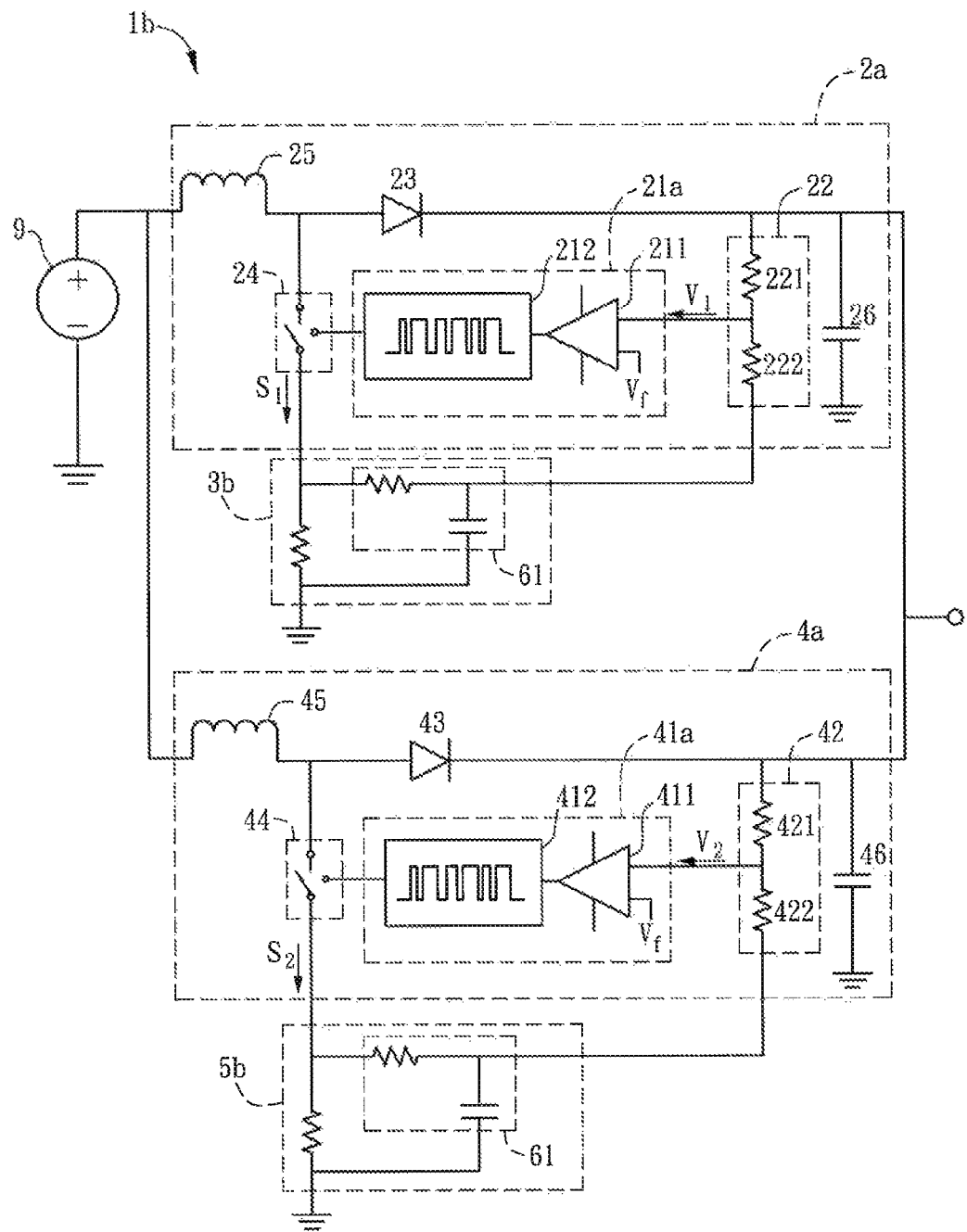
FIG. 2B is a circuit diagram of a boost converter circuit in a second embodiment.

FIG. 2B is a circuit diagram of the boost converter circuit in a second embodiment. The circuit 1b is similar to the circuit 1a, and the description of the same parts is omitted.

The first detecting unit 3h and the second detecting unit 5b further include a filter component 61 coupled to the resistor component. The filter component 61 is used to filter the noise of the first signal S1 outputted by the third end of the first switching unit 24 and the second signal S2 outputted by the third end of the second switching unit 44 and reduce the ripple value of the signal outputted by the boost converter circuit 1b.

Figure 3:
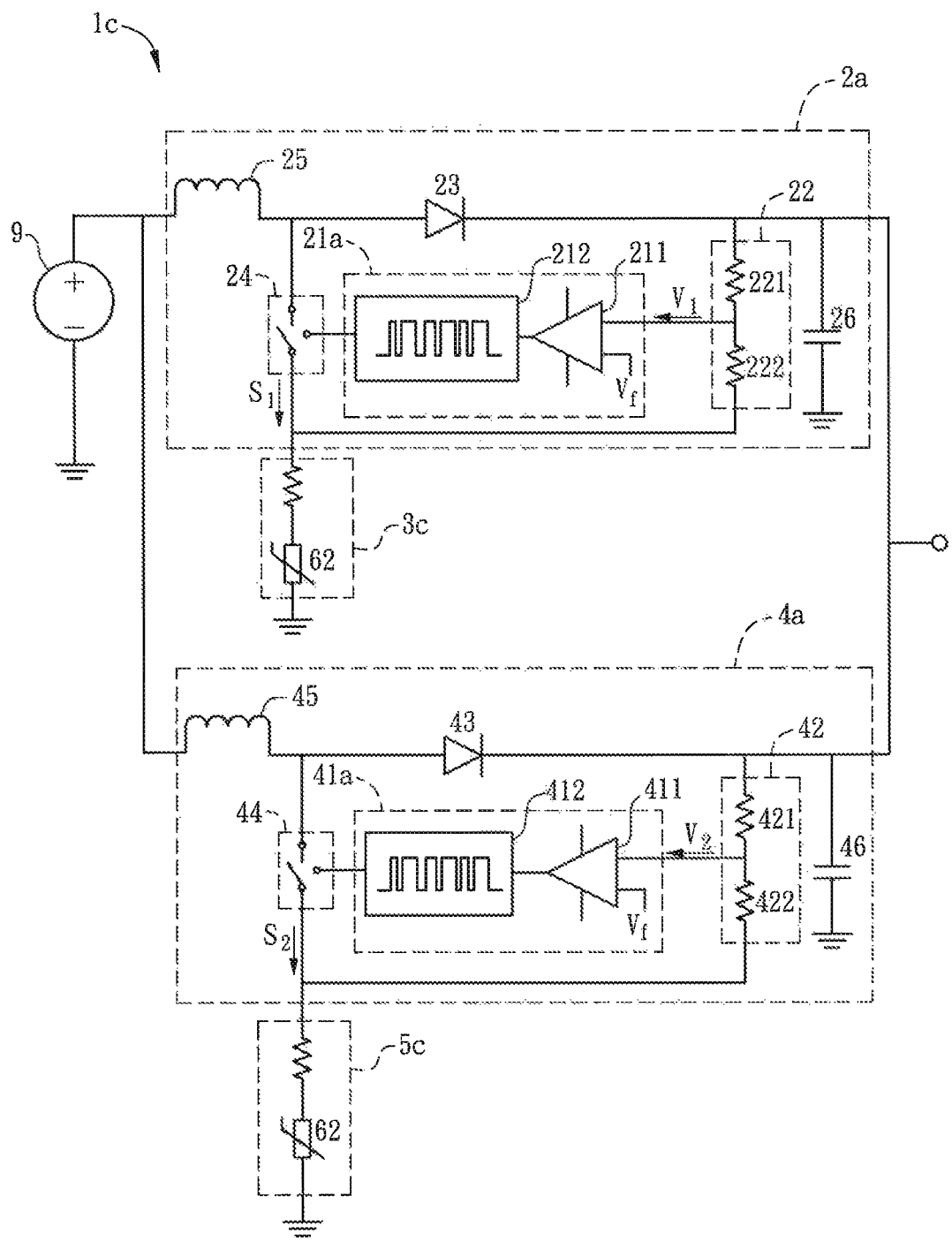
FIG. 3 is a circuit diagram of a boost converter circuit in a third embodiment.

FIG. 3 is a circuit diagram of the boost converter circuit in a third embodiment. The circuit 1c is similar to the circuit 1a, and the description of the same parts is omitted.

The first detecting unit 3c and the second detecting unit 5c further include a temperature compensation component 62 coupled to the resistor component.

Figure 4:
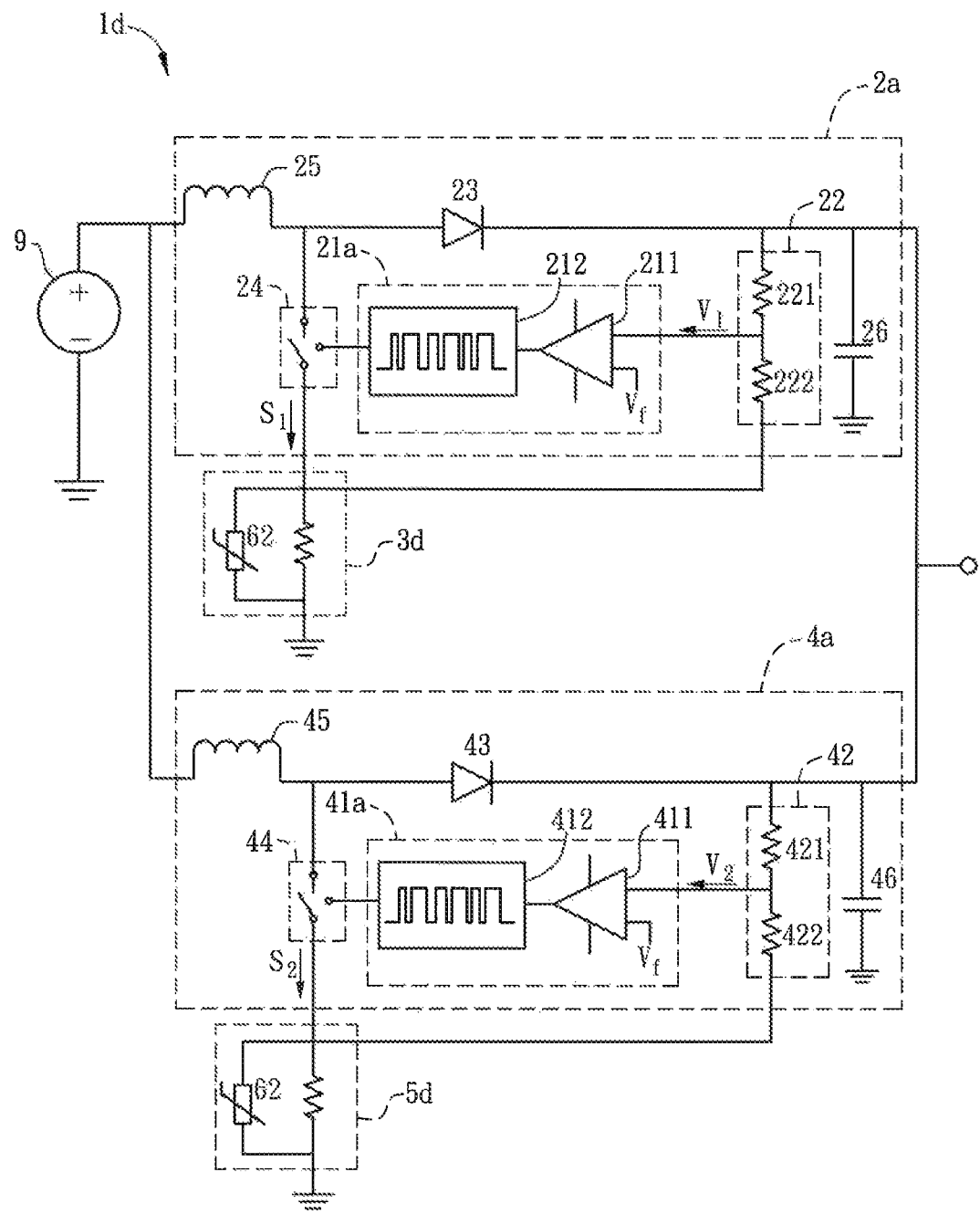
FIG. 4 is a circuit diagram of a boost converter circuit in a fourth embodiment.

FIG. 4 is a circuit diagram of the boost converter circuit in a fourth embodiment. The circuit 1d is similar to the circuit 1a, and the description of the same parts is omitted.

The first detecting unit 3d and the second detecting unit 5d further include a temperature compensation component 62 connected in parallel to the resistor component.

The temperature compensation component 62 may be a thermistor. Whether it is connected in series to the resistor component or connected in parallel to the resistor component, the temperature compensation component 62 can be used to detect and compensate the temperatures of the first detecting unit 3d and the second detecting unit 5d to avoid the difference of the temperatures between them is too large.

In addition, in other embodiments, the first detecting unit 3c, the second detecting unit 5c, the first detecting unit 3d, or the second detecting unit 5d can also include the filter component 61.

Figure 5:
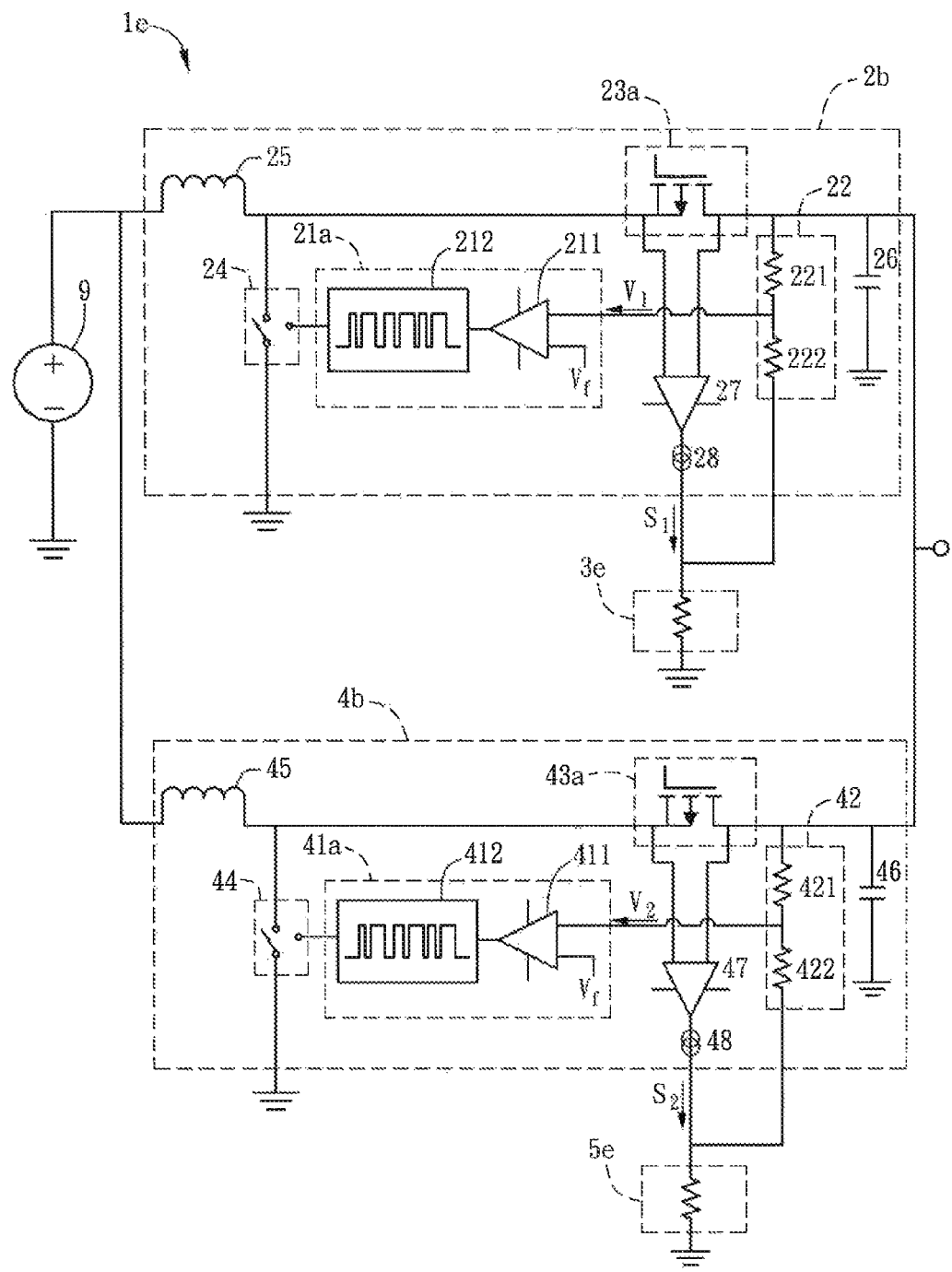
FIG. 5 is a circuit diagram of a boost converter circuit in a fifth embodiment.

FIG. 5 is a circuit diagram of the boost converter circuit in a fifth embodiment. The circuit 1e is similar to the circuit 1a, and the description of the same parts is omitted.

The first boost module 2b further includes a first operational amplifier component 27 and a first current bias component 28. A first end and a second end of the first operational amplifier component 27 are coupled to the first end and the second end of the first rectifying unit 23a, respectively. A first end of the first current bias component 28 is coupled to the third end of the first operational amplifier component 27. The first detecting unit 3e is coupled to the second end of the first current bias component 28 and the third end of the first voltage division unit 22.

The second boost module 4b further includes a second operational amplifier component 47 and a second current bias component 48. A first end and a second end of the second operational amplifier component 47 are coupled to the first end and the second end of the second rectifying unit 43a, respectively. A first end of the second current bias component 48 is coupled to a third end of the second operational amplifier component 47. The second detecting unit 5e is coupled to a second end of the second current bias component 48 and the third end of the second voltage division unit 42.

The first rectifying unit 23a and the second rectifying unit 43a are high-side metal oxide semiconductors (MOS). The first detecting unit 3e and the second detecting unit 5e are the resistor components.

The first end and the second end of the first operational amplifier component 27 detect the voltage signal of the first end and the second end of the first rectifying unit 23a and output the voltage signal. Then, the first current bias component 28 converts the voltage signal to a current signal, and the first detecting unit 3e generates a voltage corresponding to the current signal so as to change the voltage of the first end and the second end of the first voltage division unit 22, and the voltage of the first input signal V1 of the second end of the first voltage division unit 22 is adjusted. The operation principle of the second detecting unit 5e is the same.

Figure 6:
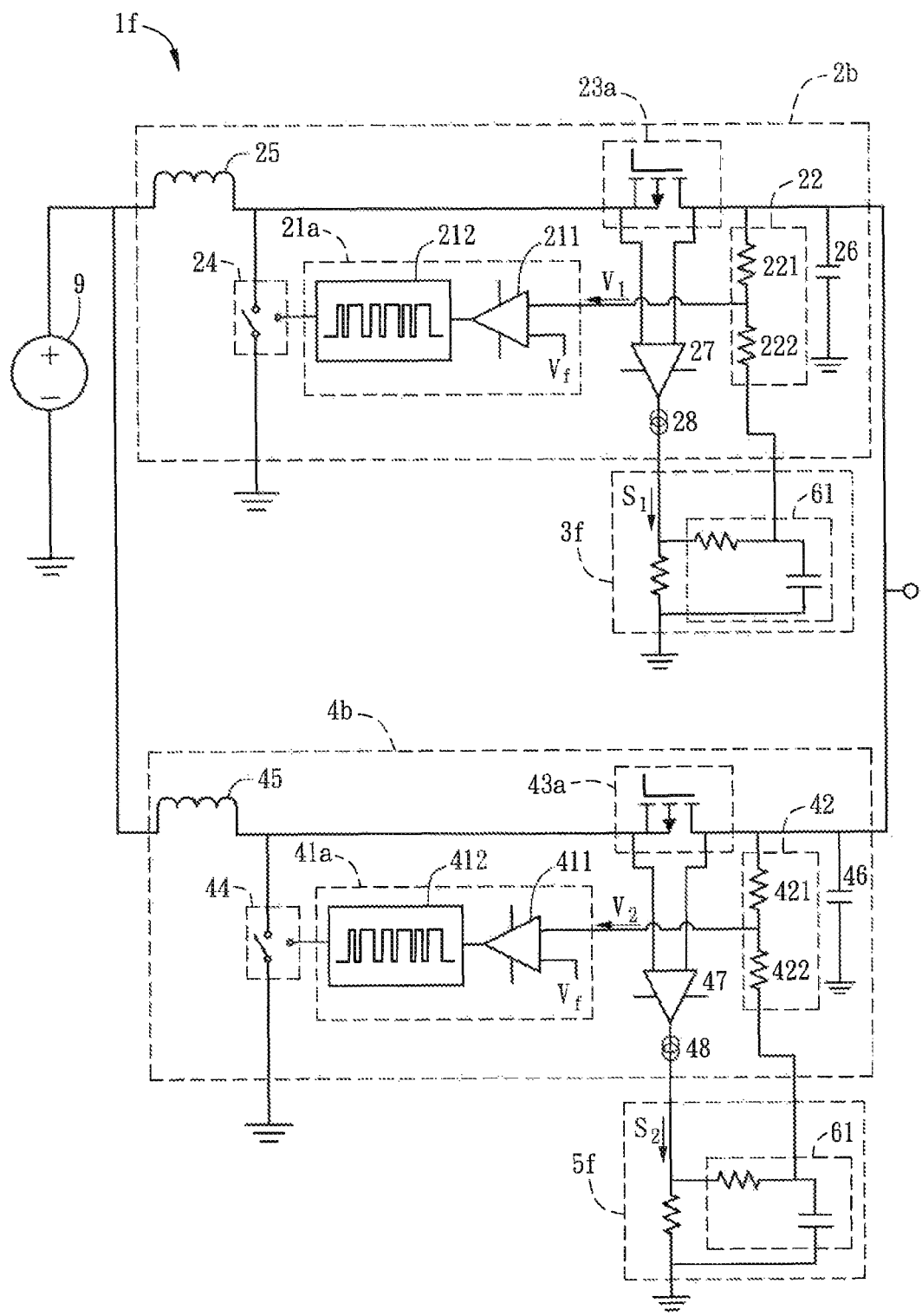
FIG. 6 is a circuit diagram of a boost converter circuit in a sixth embodiment.

FIG. 6 is a circuit diagram of the boost converter circuit in a second diagram. The boost converter circuit 1f is similar to the boost converter circuit 1e, and the description of the same parts is omitted.

The first detecting unit 3f and the second detecting unit 5f further include a filter unit coupled to the resistor component.

In above embodiments, the number of the boost modules in parallel is not limited at two, three or more than boost modules also can be connected in parallel. The operation principles of the boost modules are the same.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A boost converter circuit, comprising:
   a first boost module including:
   a first comparing control unit;
   a first inductor;
   a first rectifying unit, wherein a first end of the first rectifying unit is coupled to the first inductor;
   a first switching unit, wherein a first end of the switching unit is coupled to the first inductor, and a second end of the switching circuit is coupled to the first end of the first comparing control unit;
   a first operational amplifier component, wherein a first end of the first operational amplifier component is coupled to the first end of the first rectifying unit, and a second end of the first operational amplifier component is coupled to a second end of the first rectifying unit;
   a first current bias component, wherein a first end of the first current bias component is coupled to a third end of the first operational amplifier component; and
   a first voltage division unit, wherein a first end of the first voltage division unit is coupled to the second end of the first rectifying unit, and a second end of the first voltage division unit is coupled to the second end of the first comparing control unit;
   a first detecting unit coupled to the first boost module, wherein the first detecting unit adjusts a first input signal of the first comparing control unit according to a first signal of the first boost module;
   a second boost module coupled in parallel to the first boost module and including a second comparing control unit; and
   a second detecting unit coupled to the second boost module, wherein the second detecting unit adjusts a second input signal of the second comparing control unit according to a second signal of the second boost module.

2. The boost converter circuit according to claim 1, wherein the second boost module further includes:
   a second inductor coupled to the first inductor;
   a second rectifying unit, wherein a first end of the second rectifying unit is coupled to the second inductor;
   a second switching unit, wherein a first end of the second switching circuit is coupled to the second inductor, and a second end of the second switching circuit is coupled to a first end of the second comparing control unit; and
   a second voltage division unit, wherein a first end of the second voltage division unit is coupled to a second end of the second rectifying unit, and a second end of the second voltage division unit is coupled to a second end of the second comparing control unit.

3. The boost converter circuit according to claim 1, wherein the first detecting unit and the second detecting unit are resistor components.

4. The boost converter circuit according to claim 3, wherein the first detecting unit and the second detecting unit further include a filter component coupled to the resistor components.

5. The boost converter circuit according to claim 3, wherein, the first detecting unit and the second detecting unit further includes a temperature compensation component coupled to the resistor components.

6. The boost converter circuit according to claim 1, wherein the second boost module further includes:
   a second inductor coupled to the first inductor;
   a second rectifying unit, wherein a first end of the second rectifying unit is coupled to the second inductor;
   a second switching unit, wherein a first end of the second switching circuit is coupled to the second inductor, and a second end of the second switching circuit is coupled to the first end of the second comparing control unit;
   a second operational amplifier component, wherein a first end of the second operational amplifier component is coupled to the first end of the second rectifying unit, and a second end of the second operational amplifier component is coupled to the second end of the second rectifying unit;
   a second current bias component, wherein a second end of the second current bias component is coupled to a third end of the second operational amplifier component; and
   a second voltage division unit, wherein a first end of the second voltage division unit is coupled to the second end of the second rectifying unit, and a second end of the second voltage division unit is coupled to the second end of the second comparing control unit.

7. The boost converter circuit according to claim 6, wherein the first detecting unit and the second detecting unit are resistor components.

8. The boost converter circuit according to claim 7, wherein the first detecting unit and the second detecting unit further include a filter component coupled to the resistor components.

* * * * *